July 7, 1959
K. C. COON ET AL
2,893,236
RATE OF CLIMB TESTER
Filed April 23, 1956
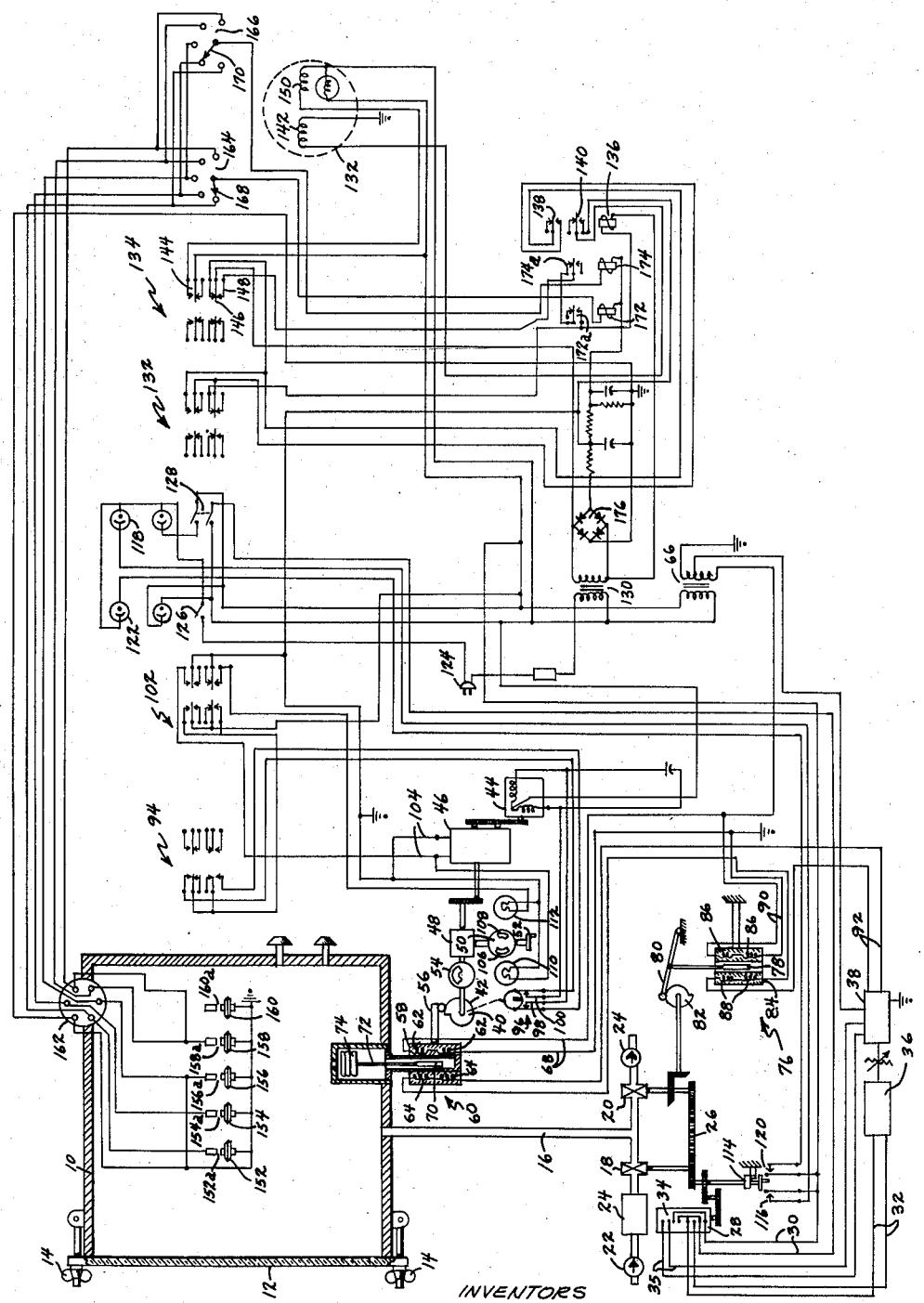
INVENTORS
KENNETH C. COON
MURRAY J. HARPOLE
EDWARD R. VAN KREVELEN
BY Stuart R. Peterson
ATTORNEY

United States Patent Office 2,893,236
Patented July 7, 1959

2,893,236

RATE OF CLIMB TESTER

Kenneth C. Coon, Minneapolis, Murray J. Harpole, St. Paul, and Edward R. Van Krevelen, Minneapolis, Minn., assignors to General Mills, Inc., a corporation of Delaware Application April 23, 1956, Serial No. 579,967

12 Claims. (Cl. 73—4)

This invention relates generally to testing apparatus and pertains more particularly to automatic equipment capable of testing and calibrating aircraft rate of climb meters.

The principal object of the invention is to provide apparatus for producing a simulated rate of climb within a test chamber which is obtained in an entirely automatic fashion. In this way an accurate basis is provided by which the set rate may be compared with the rate of climb observed on the instrument undergoing test.

Another object of the invention is to provide a rate of climb tester in which the rate of climb may be adjusted for various preferred values. More specifically, it is contemplated that there be provided a dial susceptible of facile manipulation so that relatively inexperienced personnel may be employed in conducting the various testing operations at the required rates which may vary with different rate of climb meters. In this respect, it can be appreciated that meters installed on high speed aircraft will require more elaborate rate testing than those placed aboard slower craft. Actually, to illustrate the versatility of the tester it may be mentioned that the instant equipment is designed to test and calibrate rate of climb instruments within the range of 500 to 60,000 feet per minute over an altitude range from below sea level to 80,000 feet in both ascent and descent.

A further feature of the invention resides in the provision of an automatic timer by which the accuracy of the tester itself may be checked by noting the average rate of climb of a simulated run.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

Referring now in detail to the diagrammatic view exemplifying our rate of climb tester, it is to be observed that there is provided a test chamber 10 having a door 12 equipped with heavy glass through which the meter to be tested or calibrated may be observed. When the door 12 is made fast through the medium of the clamping devices 14 the chamber 10 is rendered completely air tight.

In order to vary the pressure within the chamber 10 during a test cycle there is provided a conduit 16 leading to a pair of servo controlled valves 18 and 20. The valve 18 is connected to a compressor or source of pressure 22 via an air cleaner 24, whereas the valve 20 is connected to a vacuum pump or exhaust means 24. The valves 18 and 20 are geared together by a gear train 26 so that as one of the valves 18, 20 is closed the other is opened.

The drive or power means for the gear train 26 includes a two-phase servo motor 28 provided with reference field conductors 30 and control field conductors 32. On the same shaft with the servo motor is a tachometer 34, the purpose of which, generally stated, is to provide a rate feedback to the pre-amplifier 38 by way of conductors 35. By so doing, and in conjunction with apparatus yet to be referred to, the position of the valves 18, 20 is modified in accordance with a second derivative, i.e., a signal is produced proportional to rate of change of the rate. It will be noted that the conductors 32 are connected directly to a power amplifier 36 which is in turn connected to a pre-amplifier 38. More will be said presently concerning the signal delivered to the pre-amplifier 38 whereby the servo motor 28 is controlled in an appropriate manner so as to position continually the valves 18 and 20 in accordance with pressure desired within the test chamber 10.

In the achieving of the above alluded to desired pressure, a cam 40 is utilized having a special profile 42 produced in a manner hereinafter described. The cam 40 is rotated at a constant speed by means of a synchronous motor 44 through a solenoid operated two-speed gear changer 46. Also included in the drive mechanism for the cam 40 is a variable speed drive such as a ball and disc integrator 48 provided with a rate dial 50 and a manually adjustable knob 52 by which the integrator 48 may be set for a preferred rate of climb. Driven in unison with the cam 40 is an altitude dial 54 which indicates to the observer the particular altitude called for by the cam 40 at any given moment.

Coacting with the cam 40 is a follower 56 carried by the casing 58 of a differential transformer 60. Fixedly mounted within the casing 58 are primary coils 62 and secondary coils 64. The primary coils 62 are electrically energized from a transformer 66 by way of a pair of conductors 68. The degree of inductive coupling between the primary and secondary coils 62, 64 is governed by a movable core 70 mechanically attached to a rod 72 actuated by a bellows 74, the exterior of which is in communication with the chamber 10 so as to be responsive to pressure conditions prevailing in said chamber. Thus, the bellows 74, together with its attached core 70, provides an analog signal varying approximately logarithmically with the chamber pressure, whereas the cam 40 and its follower 56 provide a signal in accordance with the desired or required pressure. However, owing to the inherent logarithmic relation between pressure and altitude the special profile 42 of the cam referred to earlier must be designed with this relation in mind. Accordingly, if we select a bellows 74 possessing characteristics linear with pressure the cam will be contoured logarithmically. However, it may turn out that the bellows 74 will not be linear over its entire expansive and contractive range. Consequently, it is best to tailor the cam to the bellows by subjecting the bellows to a series of pressures, measuring the bellows displacement for each pressure and then contouring the cam according to these various displacements.

A second or feedback differential transformer 76 has a core 78 mechanically connected to a follower 80 engaging a feedback cam 82 rotatably positioned by the gear train 26 and hence representing the particular position of the valves 18 and 20 at any given time. Also included as part of the transformer 76 is a fixedly mounted casing 84 containing primary coils 86 and secondary coils 88. As was the situation with respect to the primary coils 62 these present primary coils 86 are also energized from the transformer 66, such energization taking place via conductors 90. Thus it can be appreciated that the two transformers are wired in series opposition and that the differential transformer 60 produces a signal responsive to the difference in actual pressure from that called for by the cam 40, and the transformer 76 a signal indicative to the relative position of the valves 18, 20. Any difference between these transformer signals is utilized as an error signal, being fed to the pre-amplifier 38 by way of conductors labelled 92. It is this error signal that is amplified by the pre-amplifier 38 and amplifier 36 to supply the control field of the servo motor 28 via the conductors 32. Thus the valves 18, 20 are controlled by the properly proportioned summation of the error signals from the differential transformers 76, 60 and the previously alluded to tachometer.

The synchronous drive motor 44 for the altitude cam 40 is connected for rotation in both directions, for the tester, to be fully effective, should be capable of testing meters in a "descend" direction as well as a "climb" direction. To this end, there is incorporated into the circuitry, a "climb-descend" reversing switch designated by the numeral 94. All that need be said about the switch unit 94, it is believed, is that it reverses the phase relationship of the drive motor 44. However, associated with the switch 94 is another switch unit 96, this being a rotary type of switch coupled directly to the cam 40. The switch unit 96 provides a protective function, having a pair of contacts 98 serving as a minimum altitude limit stop for the drive motor 44 and a second pair of contacts 100 serving as a maximum altitude limit stop. Since opening of either of these pairs of contacts 98, 100 is effective to de-energize the motor 44 it can be appreciated that the rate of climb tester cannot be subjected to excessive pressure or vacuum conditions. Through the agency of these contacts 98, 100 it will also be discerned that the cam 40 cannot be driven to such an extent that it reaches its abrupt drop off point or its abrupt rise, as the case may be.

To extend the range of the tester for a given size cam 40 and disc (of the ball and disc integrator 48), it is contemplated that the gear changer 46 be designed so as to provide two distinct speeds. Also, the altitude cam 40 can be of smaller size. Accordingly, a "high-low" switch 102 is employed which in its "high" position energizes the solenoid contained in the changer 46 via a pair of conductors 104. The rate dial 50, therefore, has two windows 106, 108, the window 106 permitting viewing of the "high" rate portion of the indicator and the window 108 permitting viewing of the "low" rate portion of said indicator. To indicate to the observer which window 106, 108 is to be used, a signal lamp 110 is disposed adjacent to the window 106 and another signal lamp 112 is located next to the other window 108. These signal lamps 110 and 112 are in circuit with the switch 102 so as to provide the proper indication, the operator of the test equipment merely looking at that portion of the indicating dial nearest the lamp that is then lighted.

Another signaling feature resides in the use of a mechanical limit stop 114 operable by the servo gear train 26. Owing to the drive arrangement between the gear train 26 and the servo valves 18, 20 it will be appreciated that the limit stop 114 represents, in effect, the positions of said valves. Pressure overload switch contacts 116 in circuit with a pressure overload signal lamp 118 and vacuum overload switch contacts 120 in circuit with a vacuum overload signal lamp 122, both actuated by the stop 114, provide an immediate and direct indication of when the safe pressure or vacuum conditions have been exceeded, this being irrespective of any failure of the system between the gear train 26 and the altitude cam 40.

As far as energizing the previously described circuitry, it is planned that the tester be connected to any conventional 115 volt A.C. outlet for its operation. Accordingly a plug 124 is provided, being in circuit with a power switch 126 and a servo switch 128, as well as supplying power to the primary of the earlier mentioned transformer 66. Also, another transformer is fed via the plug 124, this being a transformer designated by the numeral 130. The function of the transformer 130 is to furnish control power for the operation of an electric clock 132 and the gear change solenoid 46.

In conjunction with carrying out the function above, the secondary of the transformer 130 is connected to a "start-stop" switch 132 and a "reset-manual-automatic" switch 134 together with a master relay 136. The master relay 136 will be de-energized when the switch 132 is in a "stop" position and energized when in a "start" position. The relay 136 is equipped with a pair of "hold" contacts 138 by which it is retained in an energized condition until the switch 132 is returned to its stop position. Also provided on the relay 136 is a second pair of contacts 140 for the purpose of energizing, when closed, a clutch coil 142 on the clock 132 to start the clock on an operational cycle. The switch 134, as its "reset-manual-automatic" name implies, includes reset contacts 144, manual contacts 146 and automatic contacts 148. The reset contacts 144 are in circuit with a reset coil 150 by means of which the clock can be reset to a conveniently read starting position after each test.

In order to render the tester automatic, a series of bellows 152, 154, 156, 158 and 160 are mounted within the test chamber 10 and actuate switch contacts 152a, 154a, 156a, 158a, and 160a, respectively. While the bellows 152—160 can be designed to operate at various preferred pressures, depending principally upon the instruments to be tested, we will assume for the sake of discussion that the bellows 152 closes and opens its contacts 152a at a pressure corresponding to an altitude of 2,000 feet, the bellows 154 its contacts 154a at 4,000 feet, the bellows 156 its contacts 156a at 12,000 feet, the bellows 158 its contacts 158a at 40,000 and the bellows 160 its contacts 160a at 80,000 feet. The conductors for the contacts 152a—160a are brought out of the test chamber 10 through a pressure tight joint at 162 and are connected to two selector switches 164, 166, each switch having a rotary arm 168, 170 by which fixed contacts connected to the switch contacts 152a—160a can be engaged. The arm 168 is connected in circuit with a relay 172 and the arm 170 is connected in circuit with another relay 174. Inasmuch as the relay 172 is provided with normally open contacts 172a and the relay 174 with normally closed contacts 174a, it can be seen that the selector switch 164 functions as a lower level switch which operates to start the clock 132 through automatic energization of the clutch coil 142 when the test chamber 10 has reached a vacuum condition corresponding to, say 2,000 feet if the switch 164 is set on its first contact as shown and the switch 134 of course has been placed in its "automatic" position to close the contacts 148 thereof. The coil 142 is automatically de-energized through the agency of the relay 174 and its normally closed contacts 174a when the highest desired vacuum condition is reached. As depicted, the switch 166 has been set for an altitude of 4,000 feet and the clock 132 will therefore stop when this value is reached. D.C. power is furnished to the relays 172, 174 from a rectifier 176 which may be connected directly to the secondary of the transformer 130.

From the foregoing it is believed that a person familiar with this type of testing has been provided with sufficient information by which he can readily conduct a test of the rate of climb meters now being marketed. However, it is felt that an operational sequence description will be of additional help and therefore attention is now directed to an exemplified operational cycle. First of all, it should be explained that in order to start the equipment, the power switch 126 and the servo switch 128 should be placed in their "on" positions. Sufficient time should be accorded for a suitable warm-up, this being in the neighborhood of approximately two minutes. The vacuum and power sources 22, 24 should also be turned on with the test chamber door 12 in an open position. The next step is to move the "climb-descend" switch 94 to the descend position after placing the rate select switch 102 on its "high" position. By so doing, the test chamber 10 can be brought to sea level as indicated by the altitude dial 54. In this regard, it will be remembered that the altitude dial 54 is directly coupled to the altitude cam 40 so that it affords a ready indication of the rotative position that the cam 40 is in at any given moment. After this initial sequence of operations has been performed, then the climb-descend switch 94 can be restored to its normal or off position.

It is then that the rate dial 50 can be set to the desired rate of climb. In conjunction with this setting the rate select switch 102 should be moved into either its "high" or "low" position inasmuch as the integrator 48 is not designed to embrace the entire range of rates intended to be employed by the test equipment. In this regard, the switch 102 is responsible, for example, in providing high rates of from 6,000 to 60,000 feet per minute whereas its low rate position provides rates of from, say, 500 to 6,000 feet per minute. Hence the high rate sector of the dial 50 would be visible through the window 106 and the low rate sector thereof would be visible through the other window 108.

The actual testing is inaugurated by placing the climb-descend switch 94 in its climb position. If an automatic operation is desired, as would be the usual situation, the switch unit 134 is moved into automatic position and care should be taken to see that the selector switches 164 and 166 are adjusted for the altitude at which the timing is to start and stop. As illustrated in the diagrammatic view, the switch 164 is set to initiate a timing operation at 2,000 feet and the switch 166 is adjusted for the termination of the timing operation at 4,000 feet. Thus, as the altitude cam 40 rotates, it will call for gradually increasing vacuum conditions inasmuch as the profile thereof is responsible for positioning the casing 58 of the differential transformer 60 relative to its core 70. The core 70, of course, is directly connected to the altitude bellows 74 and by means of the coils 62 and 64 a signal is supplied which is in series opposition with a signal produced by means of the second differential transformer 76. Any difference in the signal from the two differential transformers is utilized in providing an input to the pre-amplifier 38 and the output of this pre-amplifier is fed to the power amplifier 36 and thence to the servo motor 28. The servo motor 28 will, of course, position the servo valves 18 and 20 in accordance with the signal delivered to it. In the illustrative situation we are assuming that a "climb" is being simulated so the vacuum valve 20 will open while the pressure valve 18 is closed. As earlier stated, the cam 40 is contoured so as to provide a linear function and thus since it is being driven at a constant rotative speed by means of the synchronous motor 44 there will be a constant rate of change as far as the vacuum being developed within the test chamber 10 is concerned.

As the vacuum increases, thus simulating an increase in altitude, the bellows 152 will be affected thereby and when the simulated altitude condition of 2,000 feet is reached, the bellows 152 will be instrumental in closing its switch contacts 152a so as to start the timing action. This timing action is achieved by reason of the clock 132 and the clutch coil 142 is energized at the appropriate time so as to effect the starting up of the clock from its "zero" position. Continued increase of the vacuum conditions within the test chamber 10 will soon cause the bellows 154 to close its contacts 154a so that the clutch coil 142 of the clock 132 will be de-energized to stop the timing operation. It will be remembered that two clock relays 172, 174 have been incorporated into the circuitry for energizing and de-energizing the clutch coil 142 in an automatic fashion. In this way, an accurate test can be made on a meter or instrument placed in the test chamber 10 for the simulated altitude conditions can be compared by noting the reading of the meter undergoing test with the reading of the altitude dial 54 or, if desired, with a manometer (not shown) in communication with the test chamber 10.

After reaching the desired altitude condition, the climb-descend switch 94 can then be thrown to its "descend" position whereby the test chamber 10 will be brought back to its zero or sea level state. It perhaps should be explained at this stage that at any time during the climb or descend test, the rate of climb adjustment may be changed, if desired, subject to the limits of the instrument undergoing test. Also any constant altitude may be held by placing the climb-descend switch in its off position. If a rate is desired during the above-mentioned descend portion of the cycle, then of course the clock 132 must be reset to a zero time by moving the switch unit 134 to its reset position. After this has occurred, then the descend portion of the cycle will be automatically timed as was the climb portion previously described. After completing the test, the chamber pressure, that is simulated altitude, is brought to ambient and the climb-descend switch 94 placed in its off position. Thus the tester is in condition for a subsequent test and allows the door to be opened so that the instrument contained therein may be removed.

Reference has already been made to the various safety features incorporated into the tester and repetition thereof will not be made at this time. However, it should be made manifest that the term "pressure" as used in the claims appended hereto will be embracive of both pressure and vacuum conditions above and below ambient. In other words, the term "pressure" is to be construed as covering conditions above and below a particular reference which may be arbitrarily taken to be sea level, as we have done. Thus, it will be noted that the tester is capable of indicating an altitude below sea level as well as above.

As many changes could be made in the above construction and many apparently widely embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A rate of climb tester comprising a test chamber, valve means in communication with said test chamber for varying the pressure therein, power means for operating said valve means, control means movable at a preferred rate to produce a signal in accordance with a rate of pressure change desired within said chamber, means for producing another signal in accordance with the position of said valve means, and means for sensing any error between said signals to produce an error signal, said sensing means controlling said power means in accordance with any such error signal to cause positioning of said valve means in a direction such that the pressure within said chamber will be changed to that called for by said control means.

2. A rate of climb tester as defined in claim 1 including means for adjusting said control means so as to provide various selected rates thereof.

3. A rate of climb tester comprising a test chamber, valve means in communication with said test chamber for varying the pressure therein, power means for operating said valve means, means including a cam and follower, said cam causing said follower to move in accordance with a rate of pressure change desired within said chamber, means responsive to pressure within the test chamber having an element movable in accordance with the test chamber pressure, means for producing a signal the magnitude of which is in accordance with the difference in position existing between said follower and said element, means for producing another signal in accordance with the position of said valve means, and means for sensing any difference between said signals to produce an error signal, said sensing means controlling said power means in accordance with the magnitude of the error signal to cause positioning of said valve means in a direction such that the pressure within said chamber will be changed to that called for by said cam.

4. A rate of climb tester comprising a test chamber, valve means in communication with said test chamber for varying the pressure therein, power means for operating said valve means, a cam whose angular position is proportional to altitude, a pressure responsive device for sensing pressure within said test chamber, a first differential device influenced by said cam and pressure responsive device to produce a signal the magnitude of which is in accordance with the difference in position between said cam and said pressure responsive device, a second differential device for producing another signal in accordance with the position of said valve means, and means for controlling said power means in accordance with any difference in said signals to cause positioning of said valve means in a direction such that the pressure within said chamber will be changed to that called for by said cam.

5. A rate of climb tester comprising a test chamber, valve means in communication with said test chamber for varying the pressure therein, power means for operating said valve means, a first differential transformer including a casing element, electrical coils within said casing element and a core element, said casing and core elements being movable relative to each other, a pressure responsive device within said test chamber having an element thereof mechanically connected to said core element so as to move said core element in accordance with pressure changes within said chamber, a rotatable cam, a follower engaging said cam, said follower being connected to said casing element and said cam being profiled so as to cause said casing element to move in accordance with the pressure desired within the test chamber whereby said differential transformer develops an electrical signal dependent upon the difference between the pressure within said test chamber and that called for by said cam, a second cam movable in accordance with said valve means, a follower engaging said second cam, a second differential transformer including a fixed casing element, electrical coils within said casing element in circuit with the electrical coils of the first transformer and a core element movable by said second follower relative to said second casing element to produce an error signal, and means for amplifying said error signal to produce an output signal for controlling said power means in accordance with the magnitude of said error signal to cause positioning of said valve means in a direction such that the pressure within said chamber will be changed to that called for by said first cam.

6. A rate of climb tester as defined in claim 5 in which said first cam is provided with a profile such that the angular position of the cam is directly proportional to altitude and is driven at a constant rate.

7. A rate of climb tester as defined in claim 6 including means for adjusting said constant rate to a preferred value.

8. A rate of climb tester as defined in claim 7 including a synchronous motor and a magnetic clutch for disengaging said synchronous motor from said adjusting means.

9. A rate of climb tester as defined in claim 8 in which said adjusting means is a ball and disc integrator.

10. A rate of climb tester comprising a test chamber, valve means in communication with said test chamber for varying the pressure therein, power means for operating said valve means, control means movable at a preferred rate to produce a signal in accordance with a rate of pressure change desired within said chamber, means for producing another signal in accordance with the position of said valve means, means for sensing any error between said signals to produce an error signal, said sensing means controlling said power means in accordance with any such error signal to cause positioning of said valve means in a direction such that the pressure within said chamber will be changed to that called for by said control means, timing means, and respective pressure sensitive switch means responsive to two different pressure conditions within said test chamber for starting the timing means at one pressure and stopping said timing means at another pressure thereby causing said timing means to provide an indication of the time elapsing between one simulated altitude when the timing means is started and a second simulated altitude when said timing means is stopped.

11. A rate of climb tester comprising a test chamber, valve means in communication with said test chamber for varying the pressure therein, power means for operating said valve means, means including a cam and follower, said cam causing said follower to move in accordance with a rate of pressure change desired within said chamber, means responsive to pressure within the test chamber having an element movable in accordance with the test chamber pressure, means for producing a signal the magnitude of which is in accordance with the difference in position existing between said follower and said element, means for producing another signal in accordance with the position of said valve means, means for sensing any difference between said signals to produce an error signal, said sensing means controlling said power means in accordance with the magnitude of the error signal to cause positioning of said valve means in a direction such that the pressure within said chamber will be changed to that called for by said cam, and means coupled to said cam for deenergizing said power means at certain spaced rotative intervals of said cam.

12. A rate of climb tester as defined in claim 10 in which said power means includes a gear train, switch means actuated by said gear train when said valve means is in an opened condition that is not to be exceeded, and signaling means energized by said switch means to indicate when such opened condition has been reached.

References Cited in the file of this patent

UNITED STATES PATENTS

| | | |
|---|---|---|
| 2,422,702 | Rodanet | June 24, 1947 |
| 2,729,780 | Miller et al. | Jan. 3, 1956 |
| 2,818,726 | Amonette et al. | Jan. 7, 1958 |

OTHER REFERENCES

Publication: Electronics, May 1951, pages 126–129, "Automatic Calibration of Radiosonde Baroswitches" by S. Haynes.